(12) United States Patent
Ito et al.

(10) Patent No.: US 6,886,401 B2
(45) Date of Patent: May 3, 2005

(54) THERMAL FLOW SENSOR HAVING SENSOR AND BYPASS PASSAGES

(75) Inventors: Akihiro Ito, Kasugai (JP); Naotsugu Seko, Kasugai (JP); Shigeru Hayashimoto, Kasugai (JP); Shoichi Kitagawa, Kasugai (JP)

(73) Assignee: CKD Corporation, Komaki (JP)

( * ) Notice: Subject to any disclaimer, the term of this patent is extended or adjusted under 35 U.S.C. 154(b) by 11 days.

(21) Appl. No.: 10/372,806

(22) Filed: Feb. 26, 2003

(65) Prior Publication Data

US 2004/0163461 A1 Aug. 26, 2004

(51) Int. Cl.⁷ .................................................. G01F 1/68
(52) U.S. Cl. ...................... 73/202; 73/202.5; 73/204.21
(58) Field of Search ................................ 73/202, 202.5, 73/204.21, 204.22

(56) References Cited

U.S. PATENT DOCUMENTS

| | | | | |
|---|---|---|---|---|
| 4,418,568 A | * | 12/1983 | Surman ....................... 73/202.5 |
| 4,487,062 A | * | 12/1984 | Olin et al. ................. 73/202.5 |
| 5,083,455 A | * | 1/1992 | Saito et al. ............... 73/204.21 |
| 5,804,717 A | * | 9/1998 | Lucas ........................... 73/202 |
| 5,892,146 A | * | 4/1999 | Kobayashi et al. ........ 73/202.5 |

FOREIGN PATENT DOCUMENTS

| | | |
|---|---|---|
| JP | A-2-138827 | 5/1990 |
| JP | B2-4-5928 | 2/1992 |
| JP | A-5-18799 | 1/1993 |
| JP | U-6-2156 | 1/1994 |
| JP | A-8-201136 | 8/1996 |
| JP | A-8-285659 | 11/1996 |
| JP | A-10-221131 | 8/1998 |
| JP | B2-2856542 | 11/1998 |
| JP | A-11-132828 | 5/1999 |
| JP | A-2000-507706 | 6/2000 |
| JP | A-2002-168669 | 6/2002 |

* cited by examiner

*Primary Examiner*—Harshad Patel
(74) *Attorney, Agent, or Firm*—Oliff & Berridge, PLC

(57) ABSTRACT

A laminated filter is fit in a passage space formed in a body. The laminated filter is made of a mesh plate including a mesh part, a first blocking plate including a blocking part, a second blocking plate including a blocking part, and a third blocking plate including a blocking part which are arbitrarily combined and layered. Accordingly, a three-layered mesh part is placed between a main passage and a sensor passage and a blocking wall is constructed of the three blocking parts.

22 Claims, 23 Drawing Sheets

THERMAL FLOW SENSOR HAVING SENSOR AND BYPASS PASSAGES

BACKGROUND OF THE INVENTION

1. Field of the Invention

The present invention relates to a thermal flow sensor for measuring a flow rate by means of hot wires, and more particularly to a thermal flow sensor capable of reducing a turbulent flow which occurs in a passage in order to stabilize measurement output.

2. Description of Related Art

As one of conventional thermal flow sensors for measuring a flow rate by using hot wires, there is a thermal flow sensor provided with a measuring chip manufactured by a semiconductor micro-machining technology as a sensor part. An example of this type of thermal flow sensor is shown in FIG. 23. In a thermal flow sensor 101 in FIG. 23, a gas to be measured is caused to flow in an inlet port 102, is made into a laminar flow by a laminar flow mechanism 103, and is caused to pass through a measuring passage 104 and flow out through an outlet port 105. For measurements of the flow rate of the gas, a measuring chip 111 connected to an electric circuit 106 is arranged in an exposed state in the measuring passage 104.

In this regard, the measuring chip 111 is constructed, as shown in FIG. 24, of a silicon chip 116 on which an upstream thermo-sensor 112, a heater 113, a downstream thermo-sensor 114, and an ambient temperature sensor 115 (these sensors 112 through 115 correspond to "hot wires") and others are formed by a semiconductor micro-machining technology.

In the thermal flow sensor 101, six electrodes D1, D2, D3, D4, D5, and D6 are provided on the silicon chip 116 of the measuring chip 111 in FIG. 24 so that the upstream thermo-sensor 112, the heater 113, the downstream thermo-sensor 114, and the ambient temp. sensor 115 are individually connected to the electric circuit 106 by wire bonding (W in FIG. 23) using those six electrodes D1–D6.

In such thermal flow sensor 101, while the gas does not flow through the measuring passage 104, the distribution of temperatures of the measuring chip 111 in FIG. 24 is symmetrical with respect to the heater 113. While the gas flows through the measuring passage 104, on the other hand, the temperature of the upstream thermo-sensor 112 is decreased and the temperature of the downstream thermo-sensor 114 is increased. Accordingly, the distribution of temperatures of the measuring chip 111 in FIG. 24 becomes unsymmetrical according to the flow rate of the gas to be measured. At this time, the degree of such unsymmetry is outputted as a difference in resistance values between the upstream thermo-sensor 112 and the downstream thermo-sensor 114. Thus, the flow rate of the gas can be measured by the electric circuit 106.

For handling of semiconductor chips during a mounting work, vacuum suction is utilized. Therefore, a pressure sensor is conventionally used to check a suction state. In recent years, however, semiconductor chips have been reduced in size rapidly. For a chip of 0.5 mm square, for example, a suction orifice (nozzle) having a diameter of 0.5 or 0.3 mm is used. As a result, the pressure in the orifice varies between a sucking state and a non-sucking state, so that the pressure sensor could not check the suction state. Under the circumstances, there has been proposed a method of checking a suction state by detecting the flow rate of air flowing through the orifice.

However, the above mentioned thermal flow sensor 101 shown in FIG. 23 has a problem of slow response (about 1–2 sec.). As this reason, it is conceivable that the laminar flow mechanism 103 could not eliminate the turbulence occurring in the measuring passage 104 and therefore an integration process is performed on output signals to prevent the output signals from being influenced by the turbulence. There is also a problem that the thermal flow sensor 101 shown in FIG. 23 is too large to be used for checking the suction state. It is therefore difficult to utilize the thermal flow sensor 101 for a suction check.

To solve the problems of response and size, the applicant of the present invention has proposed a compact thermal flow sensor of quick response (50 ms) in Japanese patent application No. 2000-368801. This thermal flow sensor, which is compact in size and excellent in response, could be used appropriately for a suction check. In the thermal flow sensor proposed by the applicant in Japanese patent application No. 2000-368801, however, there is still a problem that the influence of a turbulent flow in a passage become larger as the measured flow rate becomes higher. In other words, there further occurs a problem that, as the measured flow rate becomes higher, measurement output becomes unstable due to the turbulent flow in the passage. Consequently, even the thermal flow sensor proposed in Japanese patent application No. 2000-368801 could not sufficiently perform an accurate suction check.

SUMMARY OF THE INVENTION

The present invention has been made in view of the above circumstances and has an object to overcome the above and to provide problems a thermal flow sensor capable of stably producing measurement output even where a flow rate to be measured is high.

The thermal flow sensor according to the present invention made to achieve the purpose is characterized in a thermal flow sensor including a sensor passage, a bypass passage with respect to the sensor passage, and a hot wire for measuring a flow rate being bridged across the sensor passage, wherein the thermal flow sensor further includes a filter placed between the bypass passage and the sensor passage.

The thermal flow sensor in another aspect of the present invention is characterized in a thermal flow sensor including a sensor passage, a bypass passage with respect to the sensor passage, and a hot wire for measuring a flow rate being bridged across the sensor passage, wherein the thermal flow sensor further includes a laminar flow mechanism for making the flow of a fluid into a laminar flow, the laminar flow mechanism including a plurality of passages provided in the bypass passage.

The thermal flow sensor in another aspect of the present invention is characterized in a thermal flow sensor including a sensor passage, a bypass passage with respect to the sensor passage, and a hot wire for measuring a flow rate being bridged across the sensor passage, wherein the thermal flow sensor further includes a blocking wall which causes a fluid flowing out of the sensor passage and a fluid flowing out of the bypass passage to meet at an outlet passage formed in the body.

The thermal flow sensor in another aspect of the present invention is characterized by including: a bypass passage made of a board having a front side on which an electrode connected to an electric circuit for performing a measurement principle using a hot wire is provided and a body formed with a fluid passage having a side opening and an outlet passage formed in nonalignment relation with the fluid passage, the board being attached to the body in close contact relation to close the side opening; a sensor passage made of a groove formed in at least one of a measuring chip and the board when the measuring chip provided thereon with the hot wire and an electrode connected to the hot wire is mounted on the board so that the electrode for hot wire is joined to the electrode for electric circuit; a filter made of a plurality of laminated meshes, which is placed between the bypass passage and the sensor passage; and a blocking wall which causes a fluid flowing out of the sensor passage and a fluid flowing out of the bypass passage to meet at the outlet passage.

DETAILED DESCRIPTION OF THE PREFERRED EMBODIMENTS

A detailed description of preferred embodiments of a thermal flow sensor embodying the present invention will now be given referring to the accompanying drawings. The thermal flow sensor in the present embodiment is appropriate for flow rate measurements needing quick response and high sensitivity, for example, for a suction check for the handling of semiconductor chips during a mounting work.

(First Embodiment)

Figure 1:
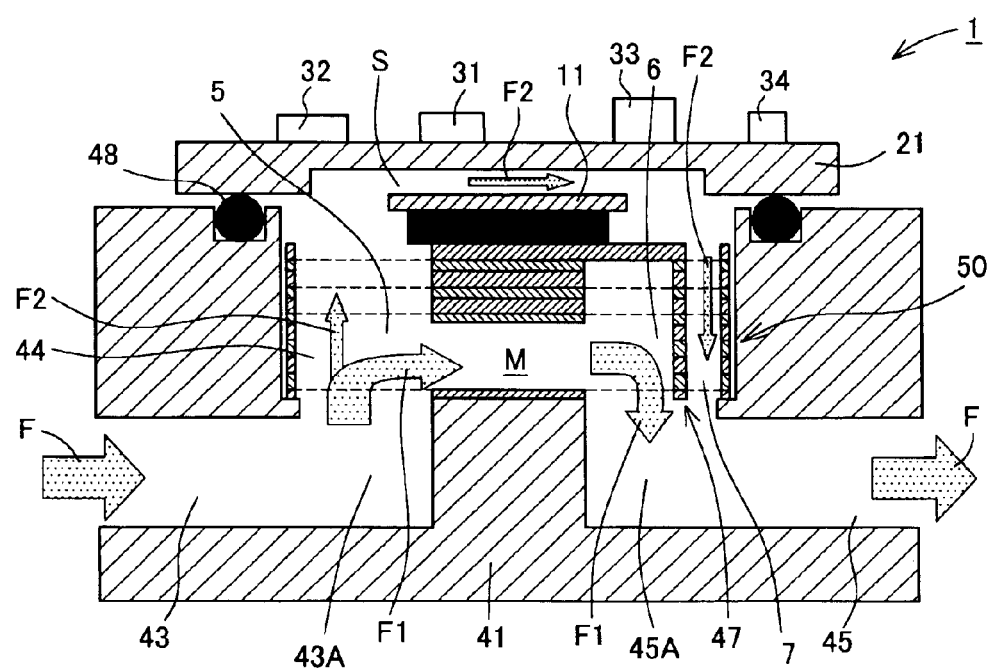
FIG. 1 is a schematic structural view of a thermal flow sensor in a first embodiment.

At first, the first embodiment is explained. FIG. 1 shows a schematic structure of a thermal flow sensor in the first embodiment. As shown in FIG. 1, the thermal flow sensor 1 in the present embodiment includes a body 41, a sensor board 21, and a laminated filter 50. The sensor board 21 is fixed to the body 41 in close contact relation through a gasket 48 by screws while the laminated filter 50 is placed in a passage space 44 of the body 41. Accordingly, a sensor passage S and a main passage M are formed. The main passage M is a bypass passage with respect to the sensor passage S. In other words, the thermal flow sensor 1 in the present embodiment includes the sensor passage and the bypass passage.

Figure 2:
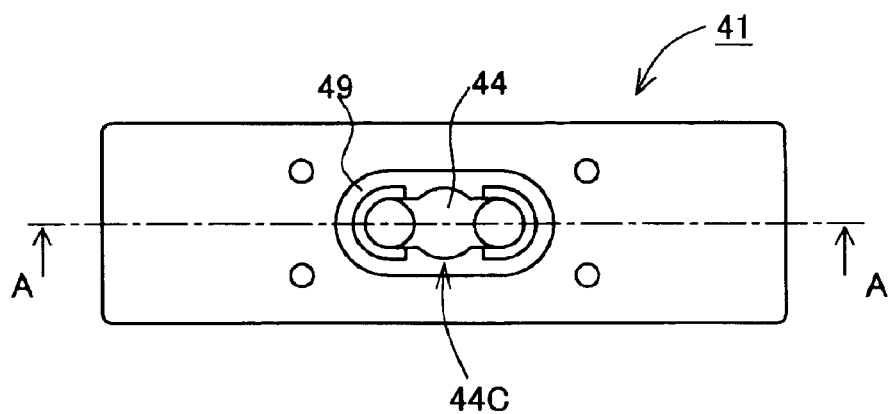
FIG. 2 is a plane view of a body.
Figure 3:
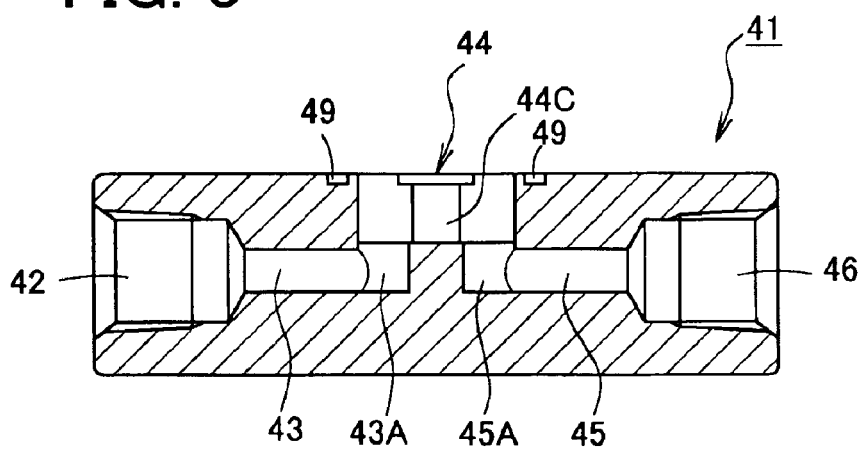
FIG. 3 is a sectional view taken along a line A—A in FIG. 2.

The body 41 is of a rectangular parallelepiped shape as shown in FIGS. 2 and 3. FIG. 2 is a plane view of the body 41 and FIG. 3 is a sectional view taken along a line A—A in FIG. 2. This body 41 is formed with an inlet port 42 and an outlet port 46 on both end faces. An inlet passage 43 is formed extending from the inlet port 42 toward the center of the body and similarly an outlet passage 45 is formed extending from the outlet port 46 toward the center of the body. It is to be noted that the outlet passage 45 is positioned below the main passage M. That is, the outlet passage and the main passage M are not in alignment with each other.

The passage space 44 is formed in the body 41 on an upper part thereof to form the main passage M and the sensor passage S. This passage space 44 has a cross section of a rectangular shape whose short sides are circular (semicircular) and which has protrusions 44C at center portions. This protrusion 44C is used for setting the laminated filter 50 or a pin 80 (see a fourth embodiment) mentioned later in place. A part of the lower side of the passage space 44 is in communication with the inlet passage 43 and the outlet passage 45. In other words, the inlet passage 44 and the outlet passage 45 are in communication with the passage space 44 through elbowed parts 43A and 45A both bent at an angle of 90 degrees. Furthermore, a groove 49 in which the gasket 48 is fit is provided on the upper surface of the body 41 along the outer periphery of the passage space 44.

Figure 4:
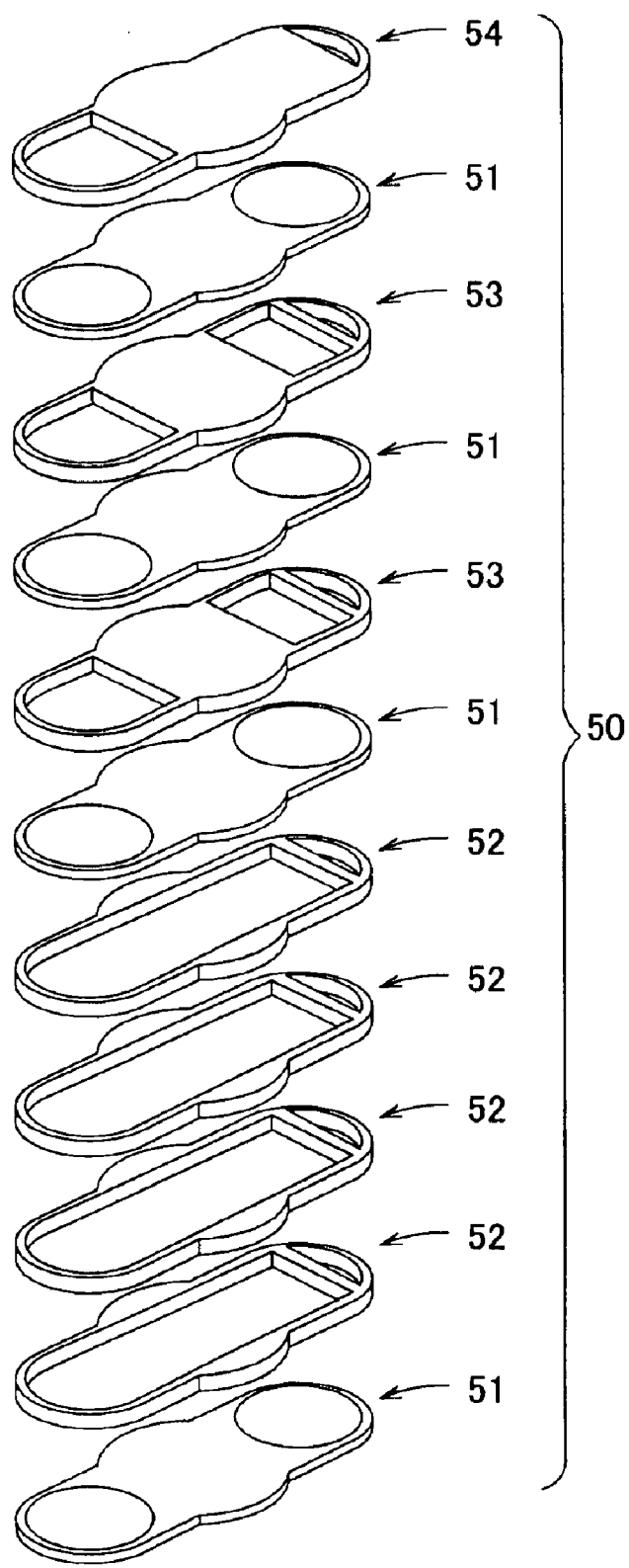
FIG. 4 is an exploded perspective view of a laminated filter.

The laminated filter 50 is constructed of a total of eleven thin laminated plates, including four kinds, as shown in FIG. 4. More specifically, the laminated filter 50 is a laminate made of a mesh plate 51, first blocking plates 52, 52, 52, 52, a mesh plate 51, a second blocking plate 53, a mesh plate 51, a second blocking plate 53, a mesh plate 51, and a third blocking plate 54 which are layered in this order from below. Each thin plate 51–54 is of a thickness of 0.5 mm or less and is processed into each shape by etching (a micromachining process). Each projected shape of the thin plates 51–54 is identical to the cross section of the passage space 44, so that the laminated filter 50 can be closely fit in the passage space 44.

Figure 5A:
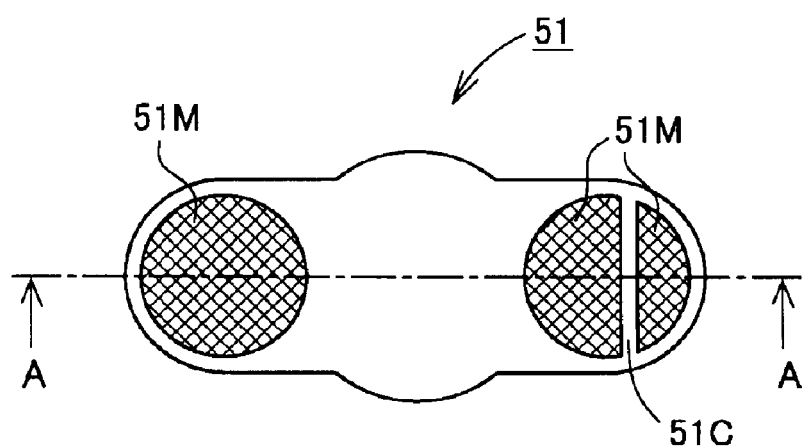
FIG. 5A is a plane view of a mesh plate.
Figure 5B:
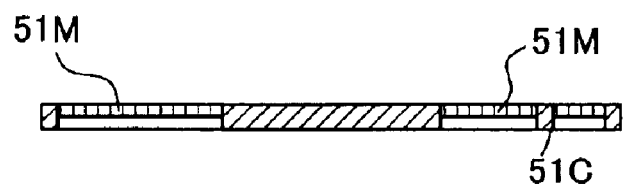
FIG. 5B is a sectional view taken along a ling A—A in FIG. 5A.
Figure 6:
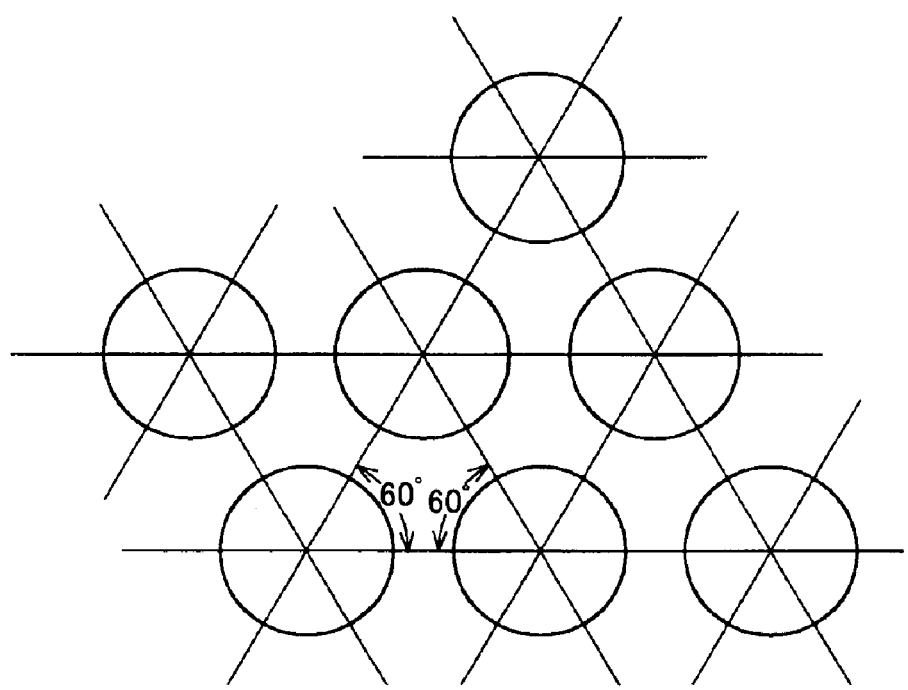
FIG. 6 is an enlarged view of a mesh part of the mesh plate shown in FIG. 5A.

Individual thin plates are explained below. At first, the mesh plate 51 is explained with reference to FIGS. 5A, 5B, and 6. FIG. 5A is a plane view of the mesh plate, FIG. 5B is a sectional view taken along a line A—A in FIG. 5A, and FIG. 6 is an enlarged view of a mesh part of the mesh plate shown in FIG. 5A. The mesh plate 51 is a thin plate having a thickness of 0.3 mm and provided with mesh parts 51M in both end portions as shown in FIGS. 5A and 5B. Each mesh part 51M is of a circular shape having a diameter of 4 mm and is formed of pores (each having a diameter of 0.2 mm) for a mesh, all the pores being arranged at a center distance of 0.27 mm, as shown in FIG. 6. In other words, the pores are formed so that the center of each pore corresponds to an apex of a regular triangle. The thickness of the mesh part 51M is 0.05 to 0.1 mm, smaller than that of the other part as shown in FIG. 5B. The mesh part 51M arranged on the outlet side (a right one in FIG. 5) is formed with a blocking part 51C.

Figure 7A:
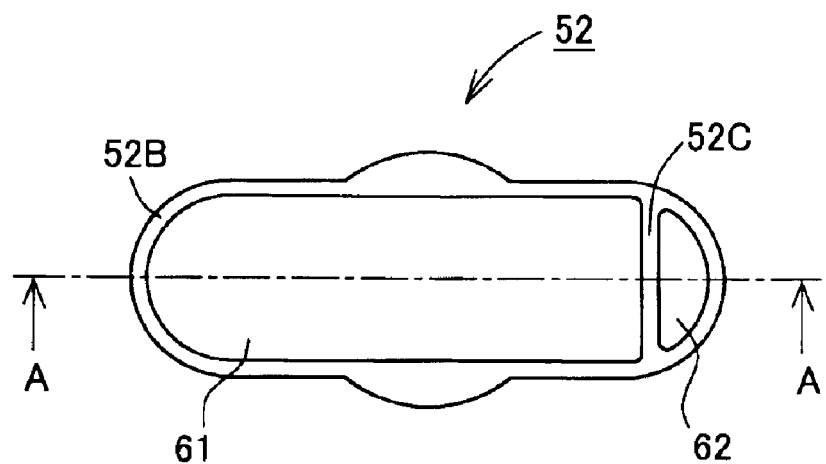
FIG. 7A is a plane view of a first blocking plate.
Figure 7B:
FIG. 7B is a sectional view taken along a line A—A in FIG. 7A.

Next, the first blocking plate 52 is explained with reference to FIGS. 7A and 7B. FIG. 7A is a plane view of the first blocking plate and FIG. 7B is a sectional view taken along a line A—A in FIG. 7A. The first blocking plate 52 is formed by etching so as to leave a peripheral part 52B and a blocking part 52C as shown in FIGS. 7A and 7B. Accordingly, the first blocking plate 52 is provided with a first opening 61 and a second opening 62. It is to be noted that the thickness of the first blocking plate 52 is 0.5 mm.

Figure 8A:
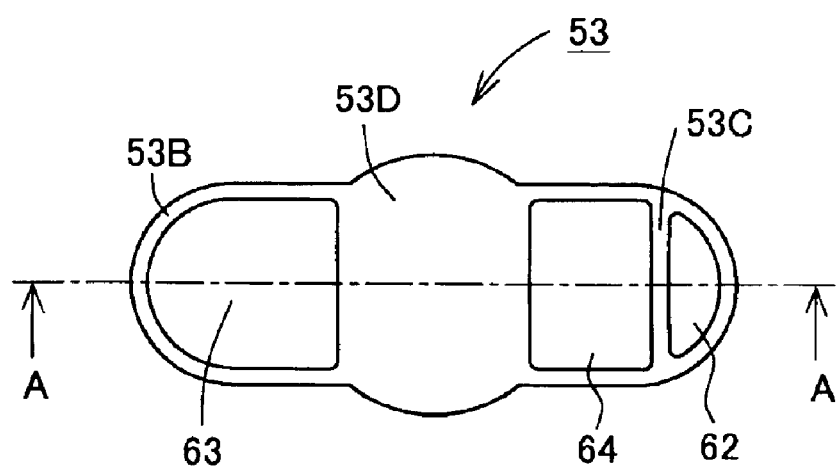
FIG. 8 is a plane view of a second blocking plate.
FIG. 8B is a sectional view taken along a line A—A in FIG. 8A.
Figure 8B:
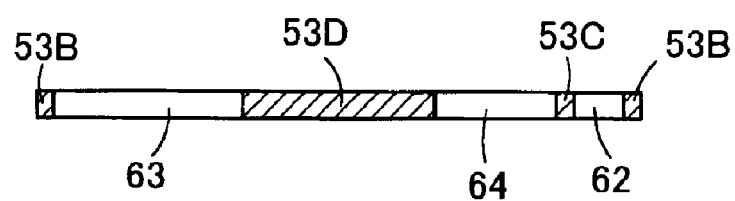

Subsequently, the second blocking plate 53 is explained with reference to FIGS. 8A and 8B. FIG. 8*a* is a plane view of the second blocking plate 53 and FIG. 8B is a sectional view taken along a line A in FIG. 8A. The second blocking plate 53 is formed by etching so as to leave a peripheral part 53B, a blocking part 53C, and a center part 53D as shown in FIGS. 8A and 8B. That is, the second blocking plate 53 corresponds to a structure that the center part of the first blocking plate 52 remains unprocessed. Accordingly, the second blocking plate 53 is provided with a third opening 63, a fourth opening 64, and a second opening 62. It is to be noted that the thickness of the second blocking plate 53 is also 0.5 mm.

Figure 9A:
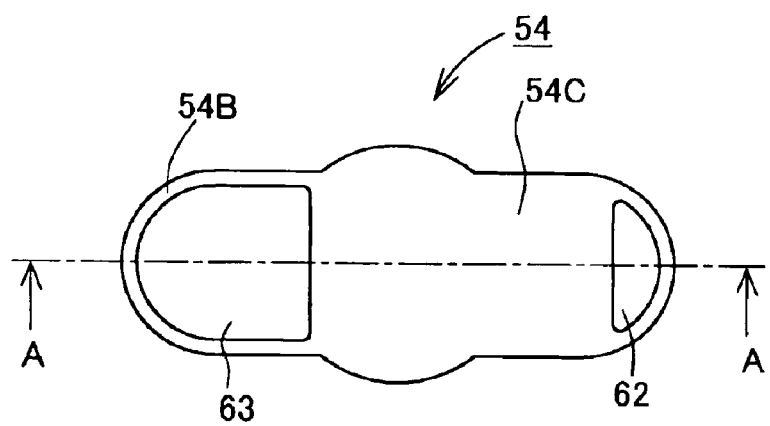
FIG. 9A is a platen view of a third blocking plate.
Figure 9B:
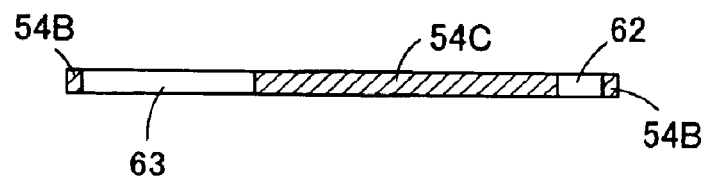
FIG. 9B is a sectional view taken along a line A—A in FIG. 9A.

Finally, the third blocking plate 54 is explained with reference to FIGS. 9A and 9B. FIG. 9A is a plane view of the third blocking plate and FIG. 9B is a sectional view taken along a line A—A in FIG. 9A. The third blocking plate 54 is formed by etching so as to leave a periphery part 54B and a blocking part 54C as shown in FIGS. 9A and 9B. More specifically, the third blocking plate 54 corresponds to the second blocking plate 53 if the fourth opening 64 is not formed so that the blocking part 53C and the center part 53D are integrally formed to constitute the blocking part 54C. Accordingly, the third blocking plate 54 is provided with a third opening 63 and a second opening 62. It is to be noted that the thickness of the third blocking plate 54 is also 0.5 mm.

Returning to FIG. 1, the mesh plate 51, the first blocking plate 52, the second blocking plate 53, and the third blocking plate 54 are combined and bonded in layers as shown in FIG. 4 to form the laminated filter 50, which is fit in the passage space 44. Thus, the first openings 61 of the first blocking plates 52 form the main passage M. The mesh plates 51, the first openings 61, and the third openings 63 formed in the thin plates 51–54 form a first communicating passage 5 which brings the inlet passage 43 into communication with the main passage M and the sensor passage S. Between the main passage M and the sensor passage S, the three layered mesh parts 51M are placed. Each interval between the mesh parts 51 is 0.7 mm since the mesh plate 51 and the second blocking plate 53 serve to as a spacer. Accordingly, the fluid to be examined is made into a laminar flow each time it passes through the mesh part 51M before flowing in the sensor passage S. Furthermore, the mesh part 51 is arranged for a communication part between the elbowed part 43A and the passage space 44 (main passage M).

In a state where the laminated filter 50 is fit in the passage space 44, the mesh parts 51, the first openings 61, and the fourth openings 64 provided on the thin plates 51–54 form a second communicating passage 6 which brings the main passage M into communication with the outlet passage 45. Furthermore, the second openings 62 provided on the thin plates 51–54 form a third communicating passage 7 which brings the sensor passage S into communication with the outlet passage 45. A blocking wall 47 is formed between these second and third communicating passages 6 and 7. This blocking wall 47 is constructed of the blocking parts 51C, 52C, 53C, and 54C provided on the thin plates 51, 52, 53, and 54 respectively. By this blocking wall 47, the meeting place of the fluid flowing out of the sensor passage S and the fluid flowing out of the main passage M corresponds to a communicating place between the elbowed part 45A and the passage space 44. The outlet passage 45 is positioned below the main passage M as mentioned above.

Consequently, the fluid flowing out of the sensor passage S and the fluid flowing out of the main passage M do not meet at and around the exit of the sensor passage S. In other words, the meeting place of the sensor passage S and the main passage M is arranged apart from the measuring chip 11 mentioned later. Accordingly, a vortex flow occurring at the meeting place of the sensor passage S and the main passage M does not cause turbulence in the fluid flowing through the sensor passage S in the area of the measuring chip 11.

Figure 10:
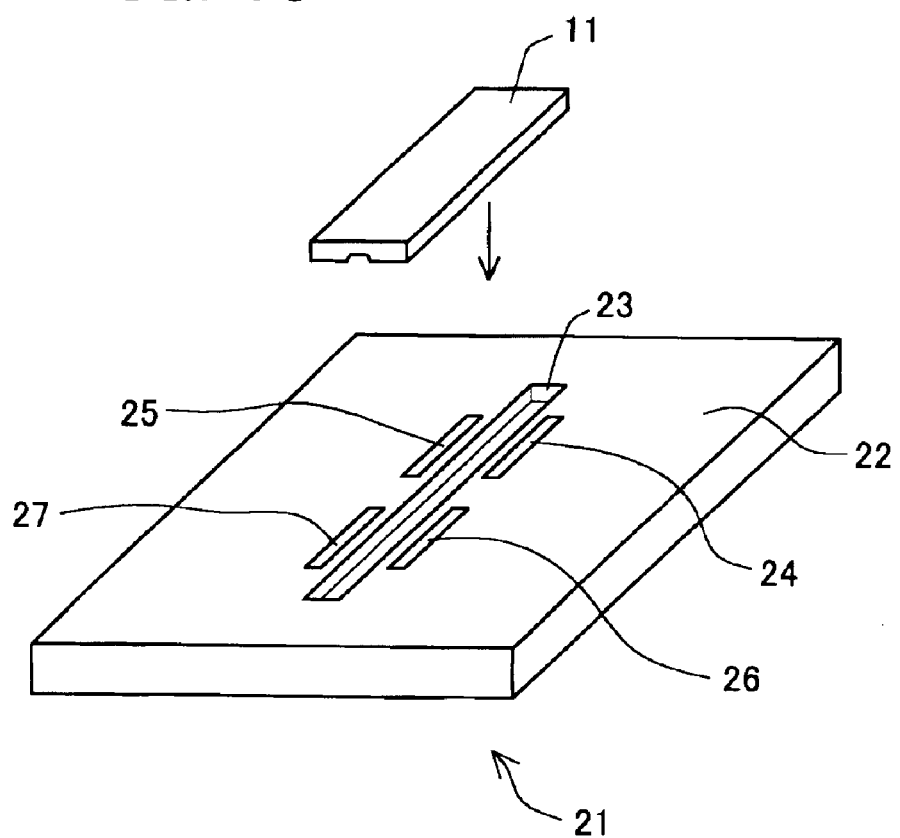
FIG. 10 is a perspective view of a sensor board.

On the other hand, the sensor board 21 is used to output an electric signal representing a measured flow rate. The sensor board 21 is therefore formed with a groove 23 at the center of the front side of a printed circuit board 22 (the face to be attached to the body 41) constituting a base of the sensor board 21 as shown in FIG. 10. Both sides of this groove 23, electrodes 24, 25, 26, and 27 for an electric circuit are provided. On the back side of the printed circuit board 22, on the other hand, an electric circuit constructed of electric elements 31, 32, 33, and 34 and others is provided (see FIG. 1). Inside the printed circuit board 22, the electric circuit electrodes 24–27 are connected to the electric circuit constructed of the electric elements 31–34 and others. The measuring chip 11 is mounted on the front side of the printed circuit board 22 in a manner mentioned later.

Figure 11A:
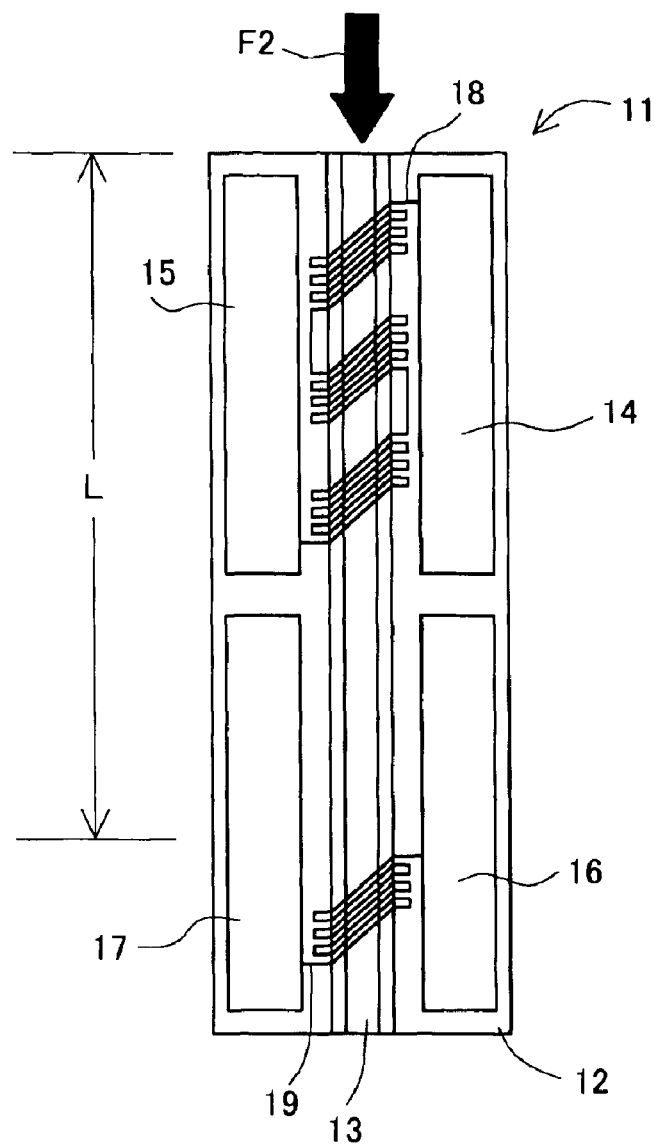
FIG. 11A is a plane view of a measuring chip.
Figure 11B:
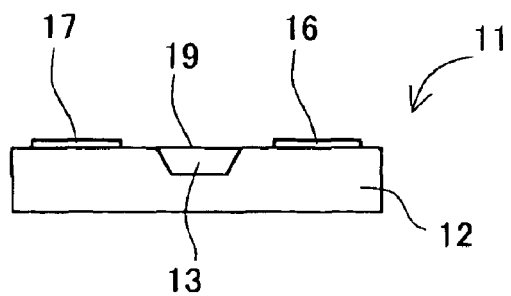
FIG. 11B is a side view of the measuring chip.

The measuring chip 11 is explained below with reference to FIGS. 11A and 11B. FIG. 11A is a plane view of the measuring chip and FIG. 11B is a side view of the measuring chip. As shown in FIGS. 11A and 11B, the measuring chip 11 is made of a silicon chip 12 processed by a semiconductor micro-machining technology. At this time, a groove 13 is formed and electrodes 14, 15, 16, and 17 for hot wires are formed on both sides of the groove 13. Furthermore, at this time, a hot wire 18 for a temperature sensor is formed extending from the hot wire electrodes 14 and 15 so as to be laid across the groove 13, and a hot wire 19 for a flow velocity sensor is formed extending from the hot wire electrodes 16 and 17 so as to be laid across the groove 13. In the measuring chip 11, furthermore, the flow velocity sensor hot wire 19 is laid in a downstream part of the sensor passage S to provide a long approach interval L for the fluid F2 flowing through the sensor passage S. This is to make the flow of the fluid F2 flowing through the sensor passage S into a laminar flow.

Moreover, the hot wire electrodes 14, 15, 16, and 17 on the measuring chip 11 are joined to the electric circuit electrodes 24, 25, 26 and 27 (see FIG. 10) on the sensor board 21 by reflow soldering, conducting adhesives, or others, so that the measuring chip 11 is mounted on the sensor board 21. When measuring chip 11 is mounted on the sensor board 21, accordingly, the temp. sensor hot wire 18 and the flow velocity sensor hot wire 19 both provided on the measuring chip 11 are connected to the electric circuit provided on the back side of the sensor board 21 through the electric circuit electrodes 24–27 (see FIG. 10) on the sensor board 21.

When the measuring chip 11 is mounted on the sensor board 21, the groove 13 of the measuring chip 11 is placed to coincide with the groove 23 of the board 21A. Accordingly, as shown in FIG. 1, when the sensor board 21 mounting thereon the measuring chip 11 is fixed to the body 41 in close contact relation through the gasket 48, the sensor passage S is formed between the sensor board 21 and the measuring chip 11 in the passage space 44 of the body 41. This sensor passage S is constructed in a long slot shape of the groove 13 of the measuring chip 11 and the groove 23 of the sensor board 21. Accordingly, in the sensor passage S, the temp. sensor hot wire 18 and the flow velocity sensor hot wire 19 are laid like a bridge.

The operation of the thermal flow sensor 1 constructed as above is explained below. In the thermal flow sensor 1, as shown in FIG. 1, a fluid (F in FIG. 1) caused to flow in the inlet passage 43 through the inlet port 42 is divided in the passage space 44 into the flow of a fluid (F1 in FIG. 1) into the main passage M and the flow of a fluid (F2 in FIG. 1) into the sensor passage S. The flows of the fluid flowing out of the main passage M and the sensor passage S are joined into one flow to be caused to flow through the outlet passage 45 and out of the body 41 through the outlet port 46 (F in FIG. 1).

The fluid (F2 in FIG. 1) flowing in the sensor passage S is caused to pass through the three-layered mesh parts 51M of the laminated filter 50 and then flow in the sensor passage S. The flows of the fluid flowing out of the main passage M and the sensor passage S meet at the place apart from the measuring chip 11 by means of the blocking wall 47. Accordingly, the vortex flow occurring at the meeting place does not exert an influence on the flow of the fluid (F2 in FIG. 1) flowing through the sensor passage S. In addition, the fluid sufficiently made into a laminar flow is caused to flow through the sensor passage S.

The fluid (F2 in FIG. 1) flowing through the sensor passage S removes heat from the hot wires 18 and 19 bridged across the sensor passage S. Accordingly, the electric circuit provided on the back side of the sensor board 21 detects the output from the hot wires 18, 19 and others to control so that a temperature difference between the hot wires 18 and 19 becomes constant.

Figure 12:
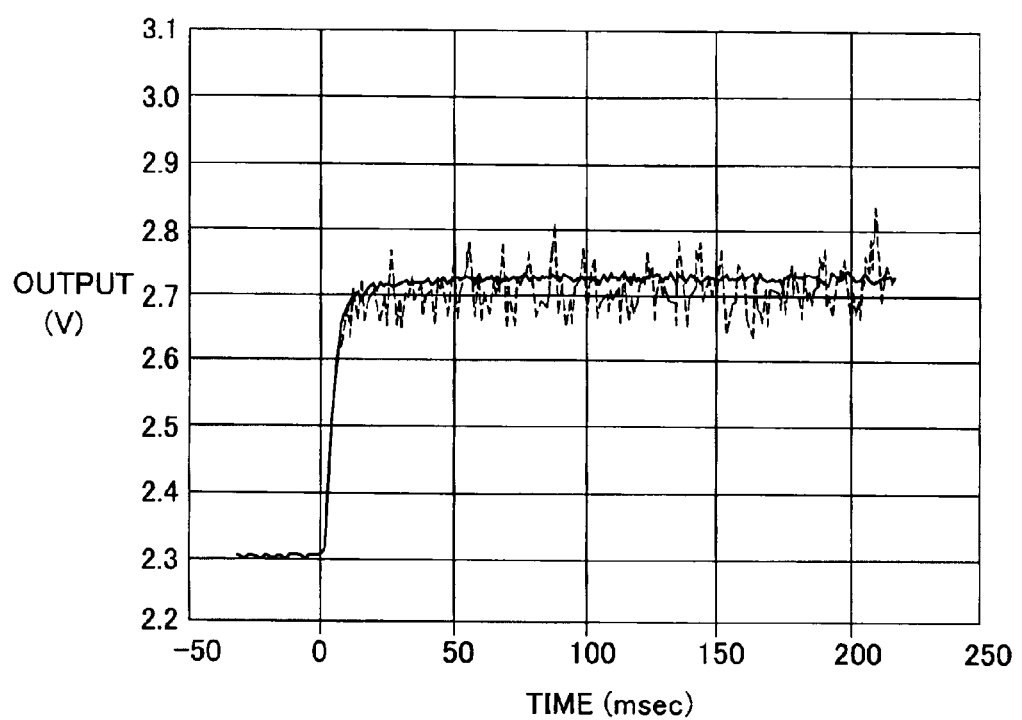
FIG. 12 is a graph showing one example of output (sensor output) of the thermal flow sensor.
Figure 13:
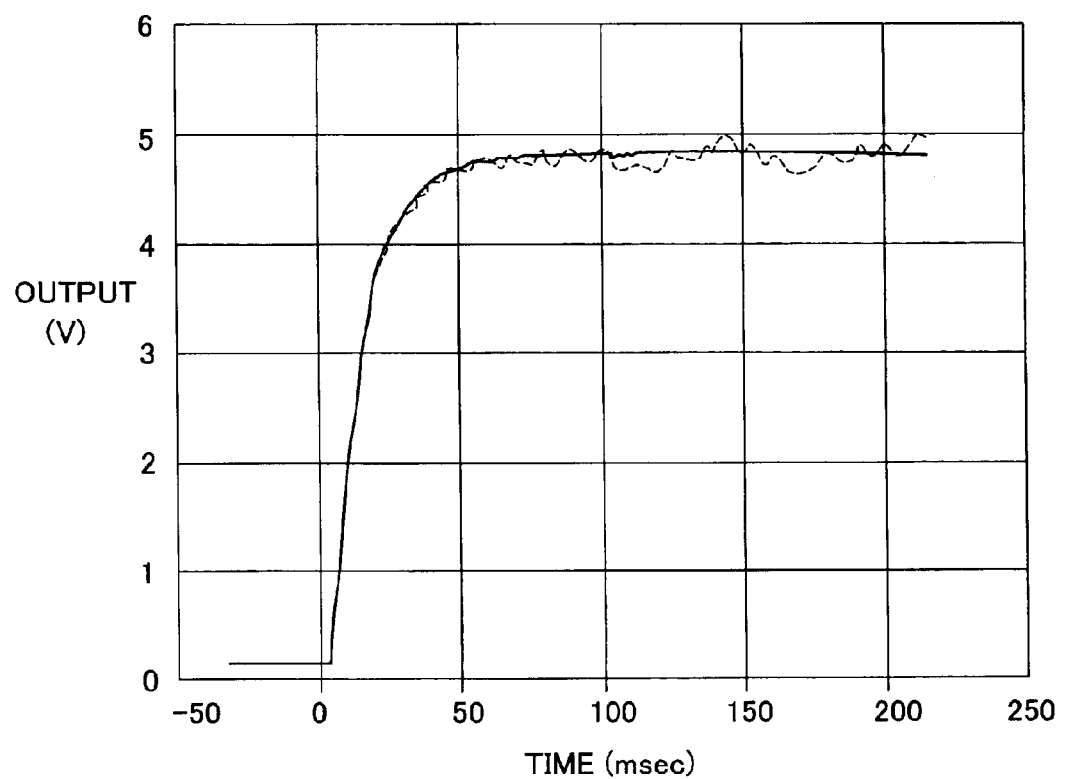
FIG. 13 is a graph showing one example of output (amplifier output) of the thermal flow sensor.

The output produced at this time is shown in FIGS. 12 and 13. FIG. 12 is a graph showing the output (sensor output) from the thermal flow sensor 1 and FIG. 13 is a graph showing the output (amplifier output) produced after the output from the thermal flow sensor 1 is filtered through an electrical filter (low-pass filter). FIGS. 12 and 13 both show the output corresponding to a flow rate of the fluid (F in FIG. 1) flowing through the inlet port 42 of 10 (l/min). A solid line indicates the output from the thermal flow sensor 1 in the first embodiment and a dotted line indicates the output from the conventional thermal flow sensor (in Japanese patent application No. 2000-368801; the same applies to the conventional thermal sensor mentioned below).

It is apparent from FIGS. 12 and 13 that the output from the thermal flow sensor 1 in the first embodiment is of smaller amplitude as compared with that in the conventional thermal flow sensor. In this respect, if the ratio of the amplitude with respect to the output value is defined as noise, in FIG. 12, the noise in the conventional thermal flow sensor is "22.36 (% FS)", whereas the noise in the thermal flow sensor 1 in the first embodiment is "2.77 (% FS)". In FIG. 13, the noise in the conventional thermal flow sensor is "4.96 (% FS)", whereas the noise in the thermal flow sensor 1 in the first embodiment is "0.43 (% FS)". This shows that the thermal flow sensor 1 in the first embodiment can reduce noise to about one-tenth the noise in the conventional thermal flow sensor. This is because the flow of the fluid flowing through the sensor passage S is in a laminar flow state as described above. It is to be noted that a bridge span is "0.415 (V)" for the thermal flow sensor 1 in the first embodiment and "0.405 (V)" for the conventional thermal flow sensor.

As above, the thermal flow sensor 1 produces extremely stable measurement output. The response is about 50 msec and the sensitivity is very high. When the thermal flow sensor 1 is used for checking a vacuum suction state for the handling of semiconductor chips during a mounting operation, therefore, the suction state can accurately be determined. This is because the flow rate in the orifice in a suction state and in a non-suction state can be measured instantaneously, accurately, and stably. Consequently, when the thermal flow sensor 1 is used for a suction check, it can avoid an erroneous judgement that the semiconductor chips are not sucked even though they are actually sucked. Thus, the suction state can be checked accurately. This makes it possible to perform a handling operation to mount the semiconductor chips of which a size reduction has been promoted recently (for example, 0.5 mm square).

As explained above, according to the thermal flow sensor 1 in the first embodiment, the laminated filter 50 is fit in the passage space 44 formed in the body 41. The laminated filter 50 includes the three-layered mesh parts 51M placed between the main passage M and the sensor passage S. Accordingly, the fluid to be measured is caused to flow in the sensor passage S after passing through the three-layered mesh parts 51M. At this time, the flow of the fluid is made laminar before flowing in the sensor passage S. In other words, even if turbulence is caused in the flow of the fluid flowing in the main passage M, the flow of the fluid is made laminar before flowing in the sensor passage S by the three-layered mesh parts 51M placed between the main passage M and the sensor passage S. Since the mesh parts 51M are constructed of three layers, a larger laminar flow effect can be produced.

The laminated filter 50 includes the blocking wall 47 constructed of the blocking parts 51C, 52C, 53C, and 54C provided on the thin plates 51, 52, 53, and 54 constituting the laminated filter 50. Accordingly, the fluid flowing out of the sensor passage S and the fluid flowing out of the main passage M are permitted to meet at the outlet passage 45 (elbowed part 45A) formed in the body 41. In other words, the fluid flowing out of the sensor passage S and the fluid flowing out of the main passage M are not permitted to meet at and around the exit of the sensor passage S. Thus, the meeting place of the sensor passage S and the main passage M is positioned apart from the measuring chip 11. This makes it possible to prevent the vortex flow occurring at the meeting place of the sensor passage S and the main passage M from causing turbulence in the flow of the fluid in the sensor passage S.

In the thermal flow sensor 1 in which the laminated filter 50 is fit in the passage space 44 in the body 41, as mentioned above, the flow of the fluid in the sensor passage S does not become turbulent even where the flow rate of the fluid to be measured is increased. Consequently, stable measurement output can be produced even when the flow rate of the fluid subject to measurement is high.

(Second Embodiment)

Figure 14:
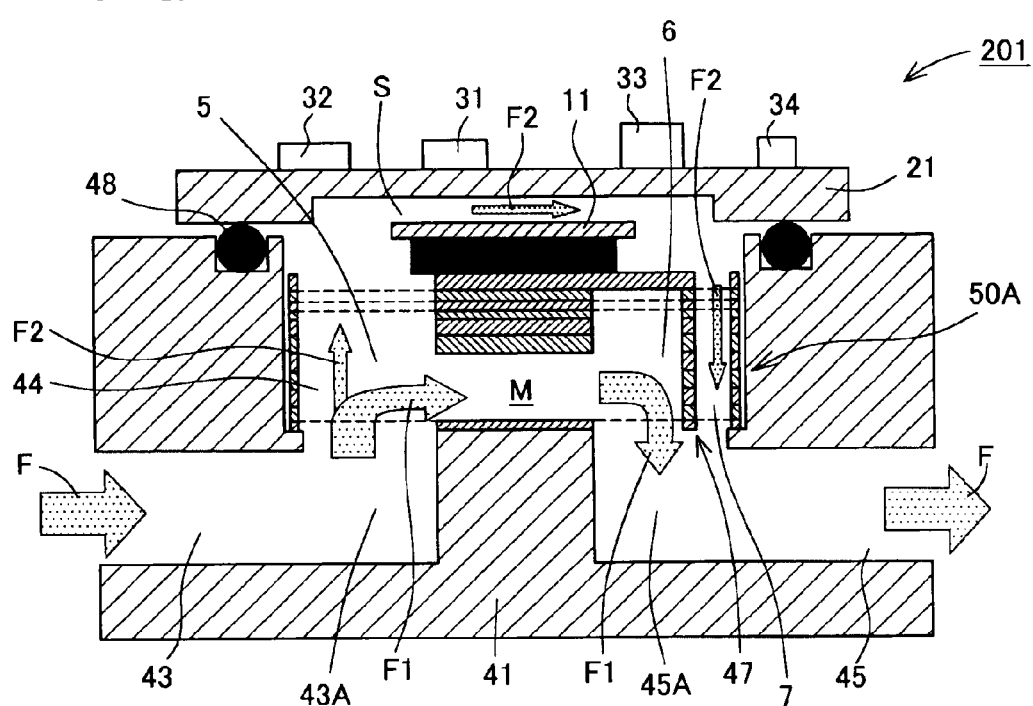
FIG. 14 is a schematic structural view of a thermal flow sensor in a second embodiment.

Next, a second embodiment will be explained. FIG. 14 is a schematic structural view of a thermal flow sensor in the second embodiment. As shown in FIG. 14, the thermal flow sensor 201 in the second embodiment has a substantially identical structure to that in the first embodiment, except that a laminated filter 50A is fit in the passage space 44 in place of the laminated filter 50. More specifically, in the thermal flow sensor 201 in the present embodiment, the laminated filter 50A in which the mesh parts 51M are arranged at smaller intervals than those in the laminated filter 50 is fit in the passage space 44. Accordingly, the following explanation is made with a focus on different points from those in the first embodiment. It is to be noted that identical structures as those in the first embodiment are indicated by the same numerals and the explanation thereof is omitted.

Figure 15:
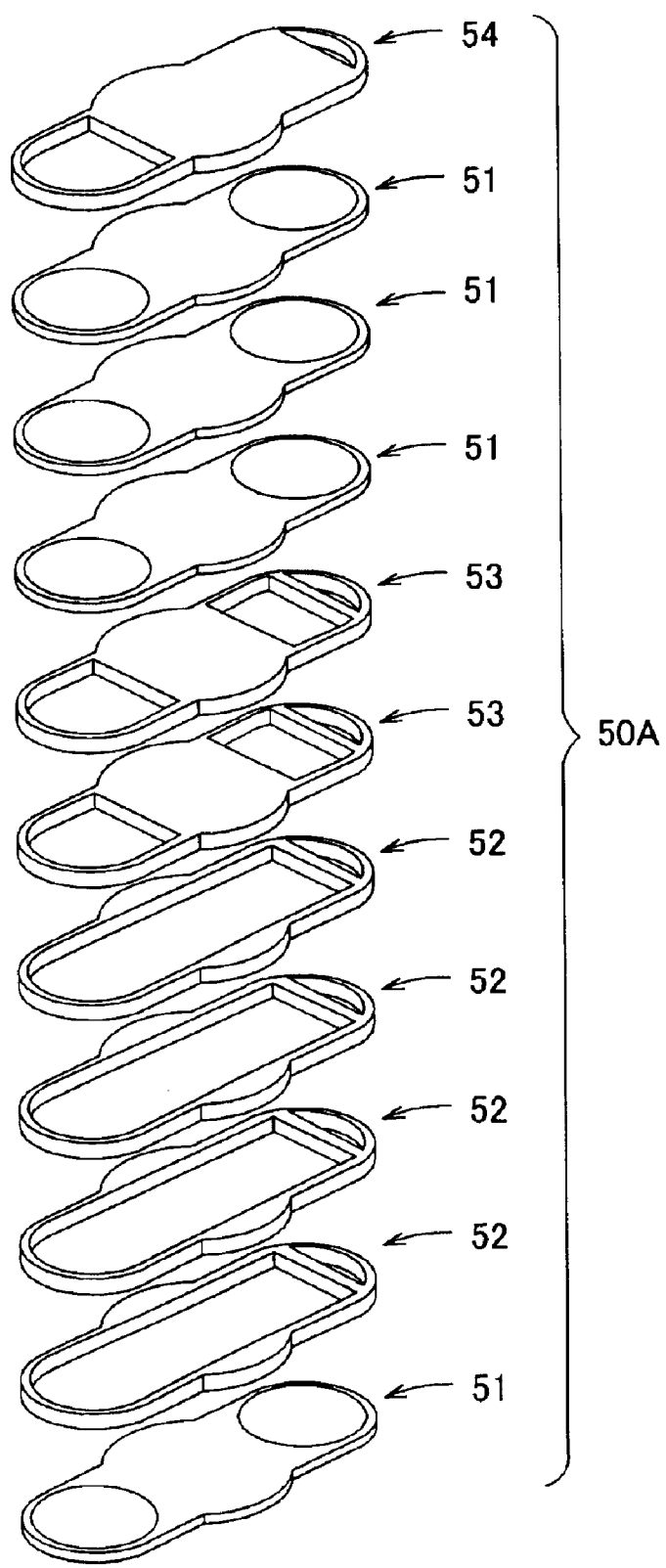
FIG. 15 is an exploded perspective view of a laminated filter.

The laminated filter 50A is explained with reference to FIG. 15. The laminated filter 50A is constructed of a total of eleven thin laminated plates, including four kinds, as shown in FIG. 15. More specifically, the laminated filter 50A is a laminate made of a mesh plate 51, first blocking plates 52, 52, 52, 52, second blocking plates 53, 53, mesh plates 51, 51, 51, and a third blocking plate 54 which are layered in this order from below. In other words, the laminated filter 50A corresponds to a structure made by changing the arrangement of the mesh plates 51 and the second blocking plates 53 in the laminated filter 50 (see FIG. 4). As a result of this arrangement change, the intervals of the mesh plates 51M are 0.2 mm.

By use of the thermal flow sensor 201 having the above structure, the output was checked under the same conditions (a flow rate: 10 (l/min)) as those in the first embodiment. The noise in the sensor output is "4.23 (% FS)" and the noise in the amplifier output is "0.69 (% FS)". It is to be noted that the bridge span is "0.426 (V)". In the conventional thermal flow sensor, the noise in the sensor output is "22.36 (% FS)" and the noise in the amplifier output is "4.96 (% FS)".

According to the thermal flow sensor 201 in the second embodiment, consequently, the noise can be reduced to about one-fifth the noise in the conventional thermal flow sensor. That is, stabilization of the measurement output can be improved. However, it is apparent that the noise increased as compared with the noise in the thermal flow sensor 1 in the first embodiment. In this regard, it can be said that the mesh parts 51M arranged at intervals of about 0.7 mm can provide a larger effect.

As explained above, in the thermal flow sensor 201 in the second embodiment, the laminated filter 50A is fit in the passage space 44 formed in the body 41. The laminated filter 50A includes the three-layered mesh parts 51M placed between the main passage M and the sensor passage S. The fluid to be measured is caused to flow in the sensor passage S after passing through the three-layered mesh parts 51M. At this time, the flow of the fluid is made laminar before flowing in the sensor passage S. In other words, even if turbulence is caused in the flow of the fluid flowing in the main passage M, the flow of the fluid is made laminar before the sensor passage S by the three-layered mesh parts 51M placed between the main passage M and the sensor passage S. Since the mesh parts 51M are constructed of three layers, a larger laminar flow effect can be produced.

Furthermore, the laminated filter 50A includes the blocking wall 47 constructed of the blocking parts 51C, 52C, 53C, and 54C provided on the thin plates 51, 52, 53, and 54 constituting the laminated filter 50. Accordingly, the fluid flowing out of the sensor passage S and the fluid flowing out of the main passage M meet at the outlet passage 45 (elbowed part 45A) formed in the body 41. In other words, the fluid flowing out of the sensor passage S and the fluid flowing out of the main passage M are not permitted to meet at and around the exit of the sensor passage S. Thus, the meeting place of the sensor passage S and the main passage M is positioned apart from the measuring chip 11. This makes it possible to prevent the vortex flow occurring at the meeting place of the sensor passage S and the main passage M from causing turbulence in the flow of the fluid in the sensor passage S.

As mentioned above, the thermal flow sensor 201 includes the laminated filter 50A fit in the passage space 44 in the body 41, so that the flow of the fluid in the sensor passage S does not become turbulent even where the flow rate of the fluid to be measured is increased. Consequently, stable measurement output can be produced even when the flow rate of the fluid to be measured is high.

(Third Embodiment)

Figure 16:
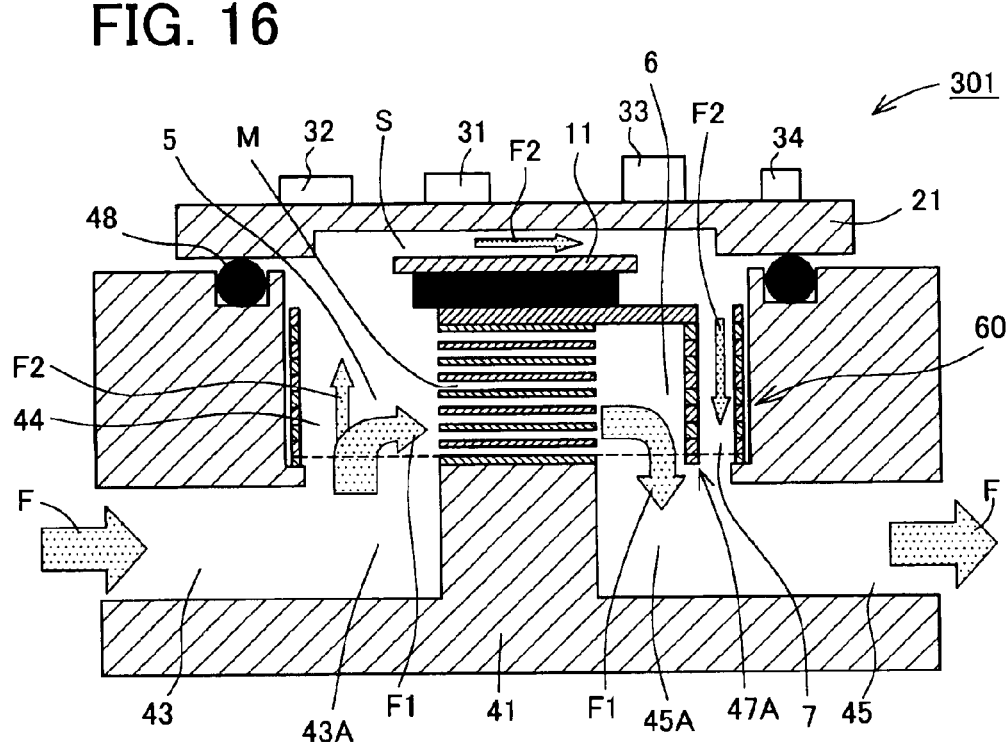
FIG. 16 is a schematic structural view of a thermal flow sensor in a third embodiment.

Next, a third embodiment will be explained. FIG. 16 is a schematic structural view of a thermal flow sensor in the third embodiment. As shown in FIG. 16, the thermal flow sensor 301 in the third embodiment has a substantially identical structure to that in the first embodiment, except that a laminated filter 60 is fit in the passage space 44 in place of the laminated filter 50. In other words, in the thermal flow sensor 301 in the present embodiment, the laminated filter 60 formed with a plurality of grooves is fit in the passage space 44. Furthermore, the laminated filter 60 differs from the laminated filter 50 in the first embodiment in that the filter 60 includes no mesh part 51M.

Accordingly, the following explanation is made with a focus on different points from those in the first embodiment. It is to be noted that identical structures as those in the first embodiment are indicated by the same numerals and the explanation thereof is omitted.

Figure 17:
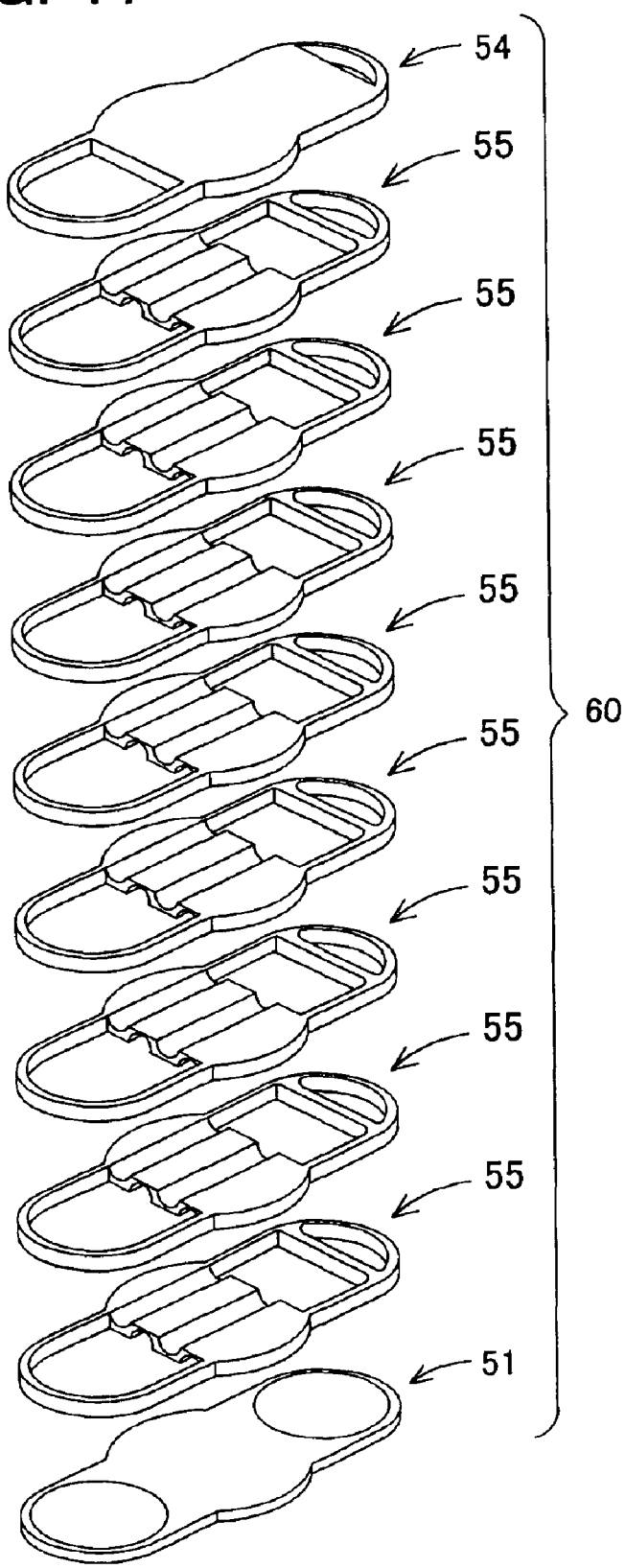
FIG. 17 is an exploded perspective view of a laminated filter.

The laminated filter 60 is explained with reference to FIG. 17. The laminated filter 60 is constructed of a total of ten thin plates, including three kinds, as shown in FIG. 17. More specifically, the laminated filter 60 is a laminate made of a mesh plate 51, first groove filters 55, 55, 55, 55, 55, 55, 55, 55, and a third blocking plate 54 which are layered in this order from below.

Figure 18A:
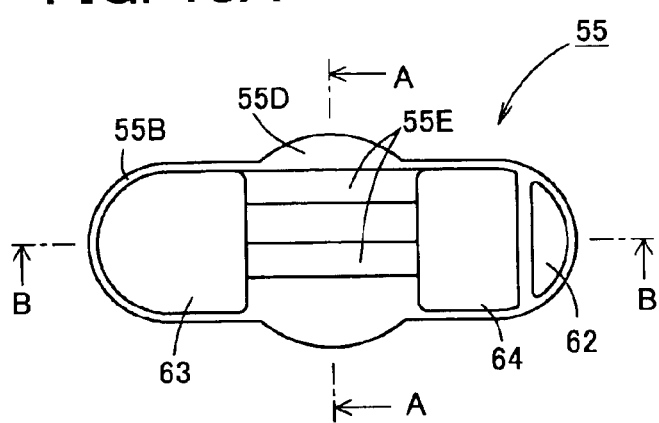
FIG. 18A is a plane view of a first groove filter.
Figure 18B:
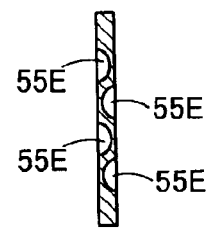
FIG. 18B is a sectional view taken along a line A—A in FIG. 18A.
Figure 18C:
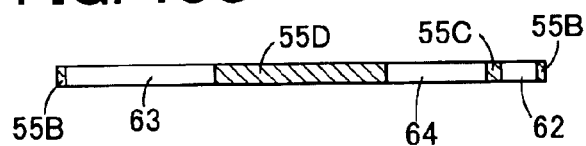
FIG. 18C is a sectional view taken along a line B—B in FIG. 18B.

The first groove filter 55 is explained below, referring to FIGS. 18A to 18C. FIG. 18A is a plane view of the first groove filter, FIG. 18B is a sectional view taken along a line A—A in FIG. 18A, and FIG. 18C is a sectional view taken along a line B—B in FIG. 18A. The first groove filter 55 is made by etching so as to leave a peripheral part 55B, a blocking part 55C, and a center part 55D and form grooves 55E in the center part 55D. That is, the groove filter 55 corresponds to a structure that grooves 56E are formed in the center part 53D of the second blocking plate 53 (see FIGS. 8A and 8B) and the blocking part 53C is not formed therein. In the center part 55D, a total of four grooves 55E are formed two on each side of the first groove filter 55. This groove 55E is 0.35 mm in depth and 0.9 mm in width. An interval between the adjacent grooves is 1.05 mm. It is to be noted that the first groove 55 has a thickness of 0.5 mm.

These mesh plate 51, first groove filters 55, and third blocking plate 54 which are bonded in layers as shown in FIG. 17 to form the laminated filter 60 which is fit in the passage space 44 formed in the body 41. Thus, the grooves 55E formed in the center part 55D of the first groove filter 55 form a large number of narrow passages in the main passage M as shown in FIG. 16. The fluid flowing in the main passage M is caused to flow through the grooves 55E, whereby making the flow of the fluid flowing through the main passage M into a laminar flow. The first groove filter 55 is formed with the grooves 55E on each side so that the laminated filter 60 can include more grooves 55E, thereby producing a larger laminar flow effect.

The laminated filter 60 further includes a blocking wall 47A constructed of the blocking parts 51C, 54C, 55 provided in the thin plates 51, 54, 55. This blocking plate 47A has the same effect as the blocking plate 47 provided in the thermal flow sensor 1 in the first embodiment. Specifically, the vortex flow occurring at the meeting place of the sensor passage S and the main passage M does not cause turbulence in the fluid flowing in the sensor passage S.

By use of the thermal flow sensor 301 having the above structure, the output was checked under the same conditions (a flow rate: 10 (l/min)) as those in the first embodiment. The noise in the sensor output is "6.84 (% FS)" and the noise in the amplifier output is "1.42 (% FS)". It is to be noted that the bridge span is "0.679 (V)". In the conventional thermal flow sensor, the noise in the sensor output is "22.36 (% FS)" and the noise in the amplifier output is "4.96 (% FS)".

According to the thermal flow sensor 301 in the third embodiment, consequently, the noise can be reduced to about one-third the noise in the conventional thermal flow sensor. That is, stabilization of the measurement output can be improved. However, it is apparent that the noise increased as compared with the noise in the thermal flow sensor 1 in the first embodiment. In this regard, it can be said that the mesh parts 51M arranged between the main passage M and the sensor passage S can provide a larger effect than the case where the laminar flow mechanism (grooves 55E) are formed in the main passage M.

As explained above, the thermal flow sensor 301 in the third embodiment includes the laminated filter 60 fit in the passage space 44 formed in the body 41, thereby providing the grooves 55E which divide the main passage M into a plurality of passages. The flow of the fluid flowing in the main passage M is thus made into a laminar flow. Accordingly, the flow of the fluid in the main passage M does not affect the flow of the fluid in the sensor passage S. The flow of the fluid can be stable in the sensor passage S.

The laminated filter 60 further includes a blocking wall 47A constructed of the blocking parts 51C, 54C, 55C provided in the thin plates 51, 54, 55 of the laminated filter 60. The fluid flowing out of the sensor passage S and the fluid flowing out of the main passage M meet at the outlet passage 45 (elbowed part 45A) formed in the body 41. In other words, the fluid flowing out of the sensor passage S and the fluid flowing out of the main passage M are not permitted to meet at an around the exit of the sensor passage S. Thus, the meeting place of the sensor passage S and the main passage M is positioned apart from the measuring chip 11. This makes it possible to prevent the vortex flow occurring at the meeting place of the sensor passage S and the main passage M from causing turbulence in the flow of the fluid in the sensor passage S.

As above, the thermal flow sensor 301 includes the laminated filter 60 fit in the passage space 44 in the body 41, providing the grooves 55E (laminar flow mechanism) which divide the main passage M into a plurality of passages. Accordingly, the flow of the fluid flowing in the main passage M is made into a laminar flow. Furthermore, the blocking plate 47A is arranged to keep the meeting place of the sensor passage S and the main passage M apart from the measuring chip 11 so that the vortex flow occurring at the meeting place does not cause turbulence in the flow of the fluid in the sensor passage S. Thus, the flow of the fluid in the main passage M does not become turbulent and the vortex flow occurring at the meeting place of the sensor passage S and the main passage M does not cause turbulence in the fluid in the sensor passage S. Even if the flow rate of the fluid to be measured becomes high, the flow of the fluid in the sensor passage S does not become turbulent. Consequently, stable measurement output can be produced even where the flow rate of the fluid to be measured is high.

(Fourth Embodiment)

Figure 19:
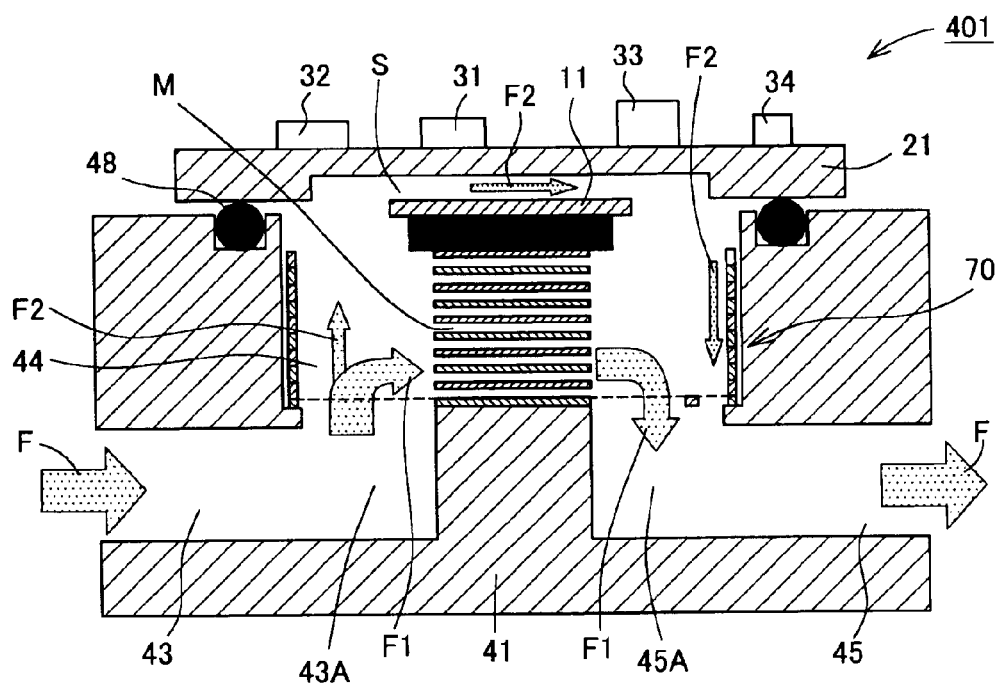
FIG. 19 is a perspective structural view of a thermal flow sensor in a fourth embodiment.

Finally, a fourth embodiment will be explained. FIG. 19 shows a schematic structure of a thermal flow sensor in the fourth embodiment. As shown in FIG. 19, the thermal flow sensor 401 in the fourth embodiment has a substantially identical structure to the thermal flow sensor 1 in the first embodiment, except that a laminated filter 70 is fit in the passage space 44 in place of the laminated filter 50. Specifically, in the thermal flow sensor 401 in the present embodiment, as in the case of the third embodiment, the laminated filter 70 provided with a plurality of grooves is fit in the passage space 44. However, the laminated filter 70 differs from the laminated filter 60 in the third embodiment in that the filter 70 includes no blocking wall 47A and the number of grooves is different. The following explanation is made with a focus on different points from those in the first (and third) embodiment. It is to be noted that identical structures as those in the first embodiment are indicated by the same numerals and the explanation thereof is omitted.

Figure 20:
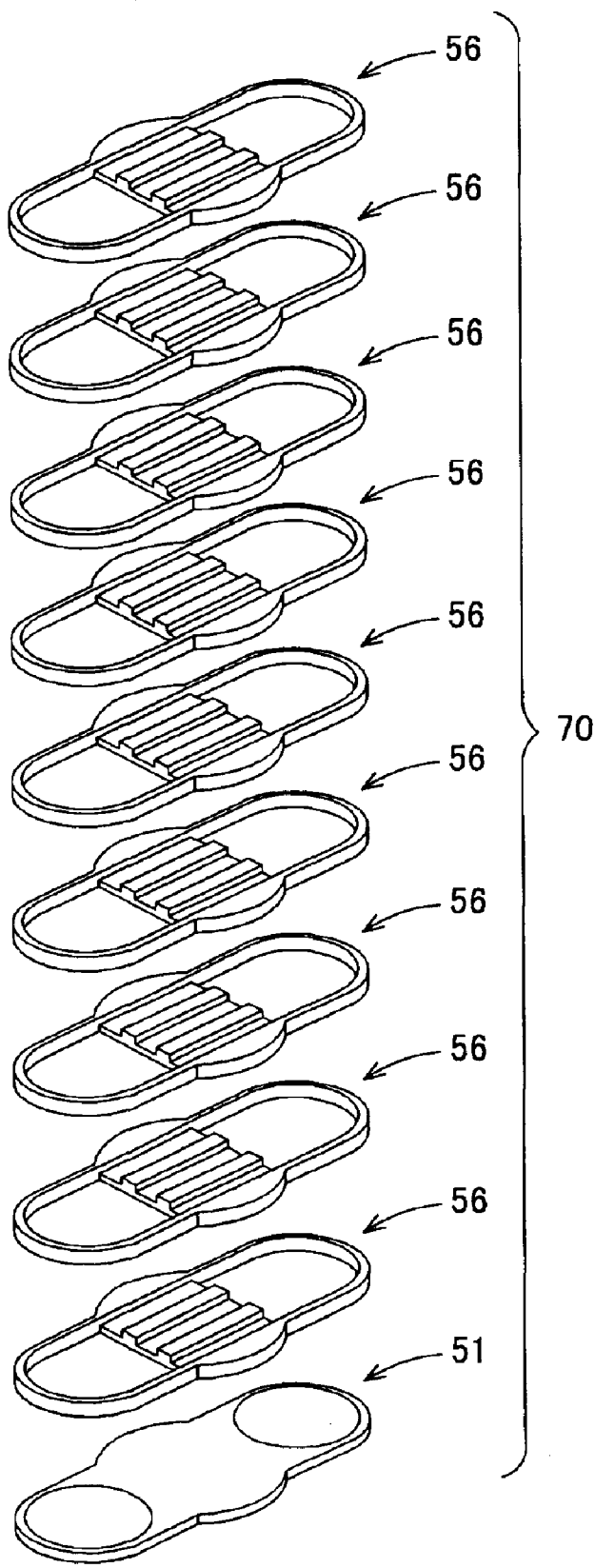
FIG. 20 is an exploded perspective view of a laminated filter.

The laminated filter 70 is explained with reference to FIG. 20. The laminated filter 70 is constructed of a total of ten thin plates, including two kinds, as shown in FIG. 20. More specifically, the laminated filter 70 is a laminate made of a mesh plate 51, second groove filters 56, 56, 56, 56, 56, 56, 56, 56, 56 which are layered in this order from below.

Figure 21A:
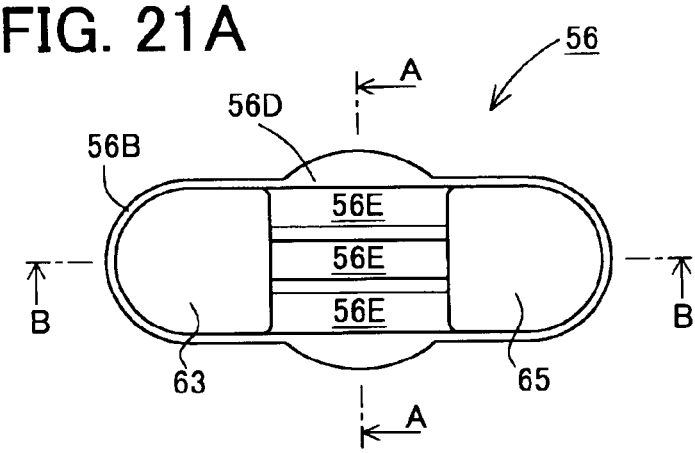
FIG. 21A is a plane view of a second groove filter.
Figure 21B:
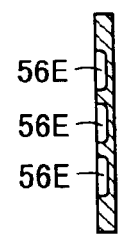
FIG. 21B is a sectional view taken along a line A—A in FIG. 20A.
Figure 21C:
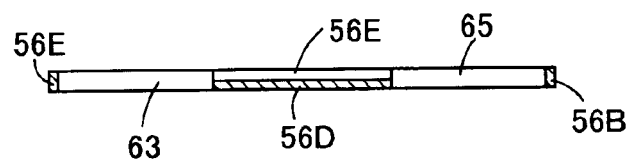
FIG. 21C is a sectional view taken along a line B—B in FIG. 20B.

The second groove filter 56 is explained below, referring to FIGS. 21A to 21C. FIG. 21A is a plane view of the second groove filter, FIG. 21B is a sectional view taken along a line A—A in FIG. 21A, and FIG. 21C is a sectional view taken along a line B—B in FIG. 21A. The second groove filter 56 is made by etching so as to leave a peripheral part 56B and a center part 56D and form grooves 56E in the center part 56D. That is, the second groove filter 56 corresponds to a structure that the grooves 56E are formed in the center part 53D of the second blocking plate 53 (see FIGS. 8A and 8B). In the center part 56D, three grooves 56E are formed on one side of the filter 56. This groove 56E is 0.35 mm in depth and 1.1 mm in width. Each interval between the adjacent grooves is 0.2 mm. It is to be noted that the second groove filter 56 has a thickness of 0.5 mm.

These mesh plate 51 and second groove filters 55 are bonded in layers as shown in FIG. 20 to form the laminated filter 70 which is fit in the passage space 44 formed in the body 41. Thus, the grooves 56E formed in the center part 56D of the second groove filter 56 form a large number of narrow passages in the main passage M as shown in FIG. 19. The fluid flowing in the main passage M is caused to flow through each groove 56E, thereby making the flow of the fluid flowing through the main passage M into a laminar flow. The second groove filter 56 is formed with the three grooves 56E so that the laminated filter 70 can include a larger number of grooves 56E, thereby producing a greater laminar flow effect.

By use of the thermal flow sensor 401 having the above structure, the output was checked under the same condition (a flow rate: 10 (l/min)) as those in the first embodiment. The noise in the sensor output is "13.47 (% FS)" and the noise in the amplifier output is "1.76 (% FS)". It is to be noted that the bridge span is "0.498 (V)". In the conventional thermal flow sensor, the noise in the sensor output is "22.36 (% FS)" and the noise in the amplifier output is "4.96 (% FS)".

According to the thermal flow sensor 401 in the fourth embodiment, consequently, the noise can be reduced to about three-fifth the noise in the conventional thermal flow sensor. That is, stabilization of the measurement output can be improved. However, it is apparent that the noise increased as compared with the noise in the thermal flow sensor 1 in the third embodiment. In this regard, it can be said that the thermal flow sensor provided with the blocking wall 47A can produce a larger effect.

Figure 22:
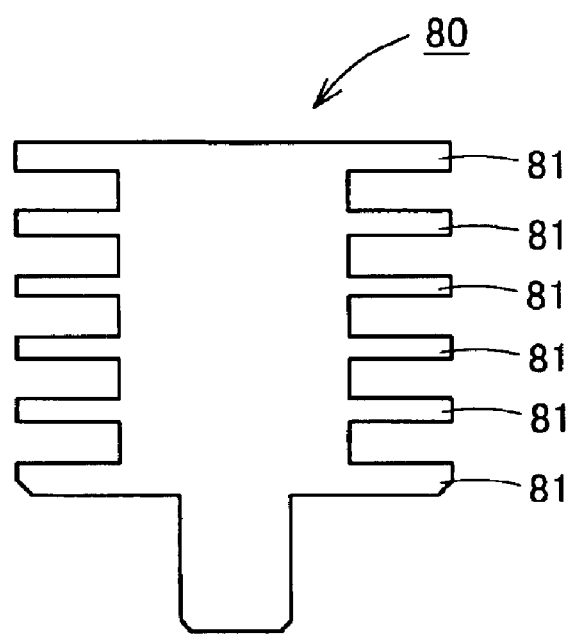
FIG. 22 is a front view of a laminar flow pin used in a modification of the fourth embodiment.
Figure 23:
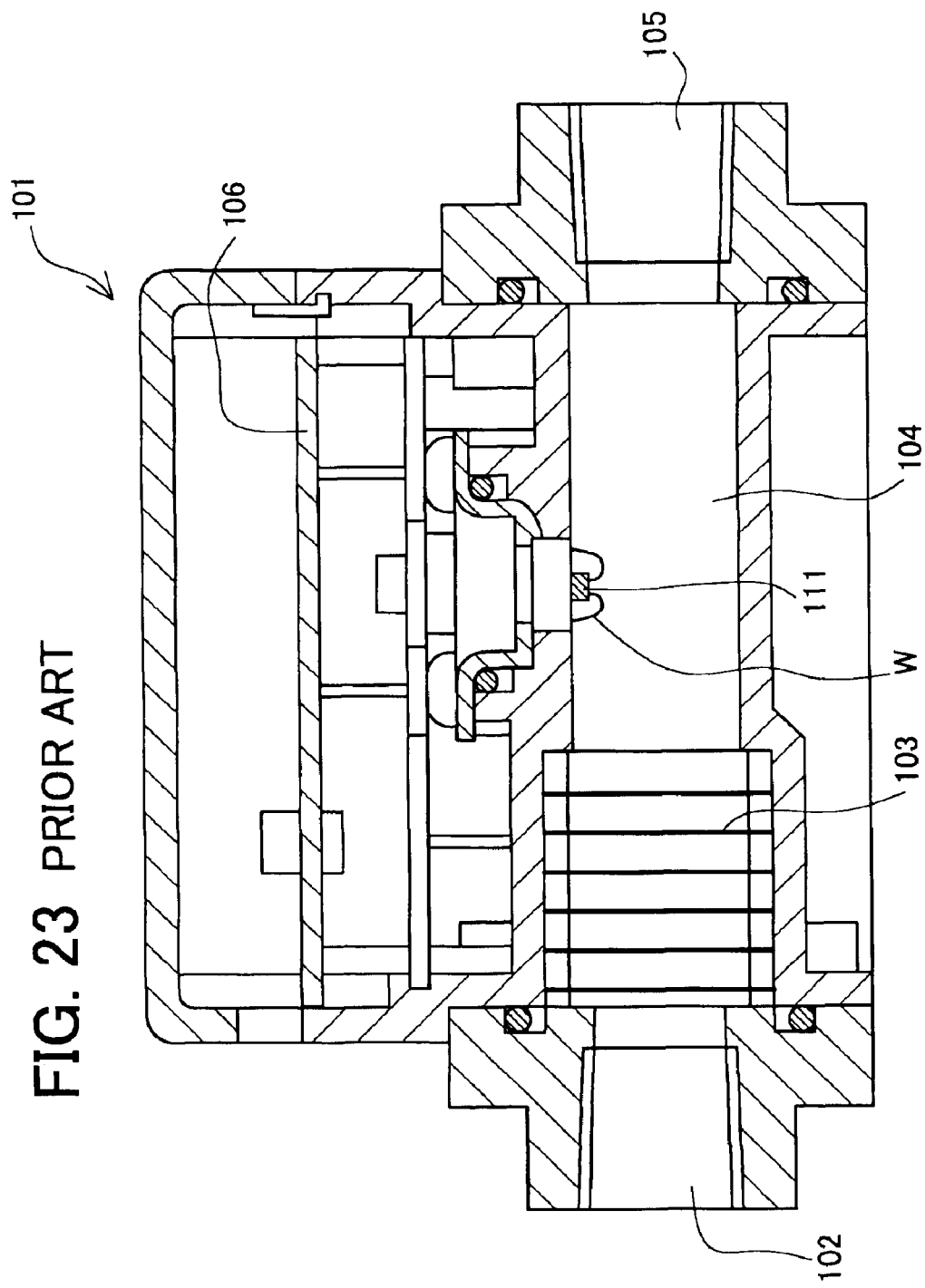
FIG. 23 is a sectional view of a conventional thermal flow sensor.
Figure 24:
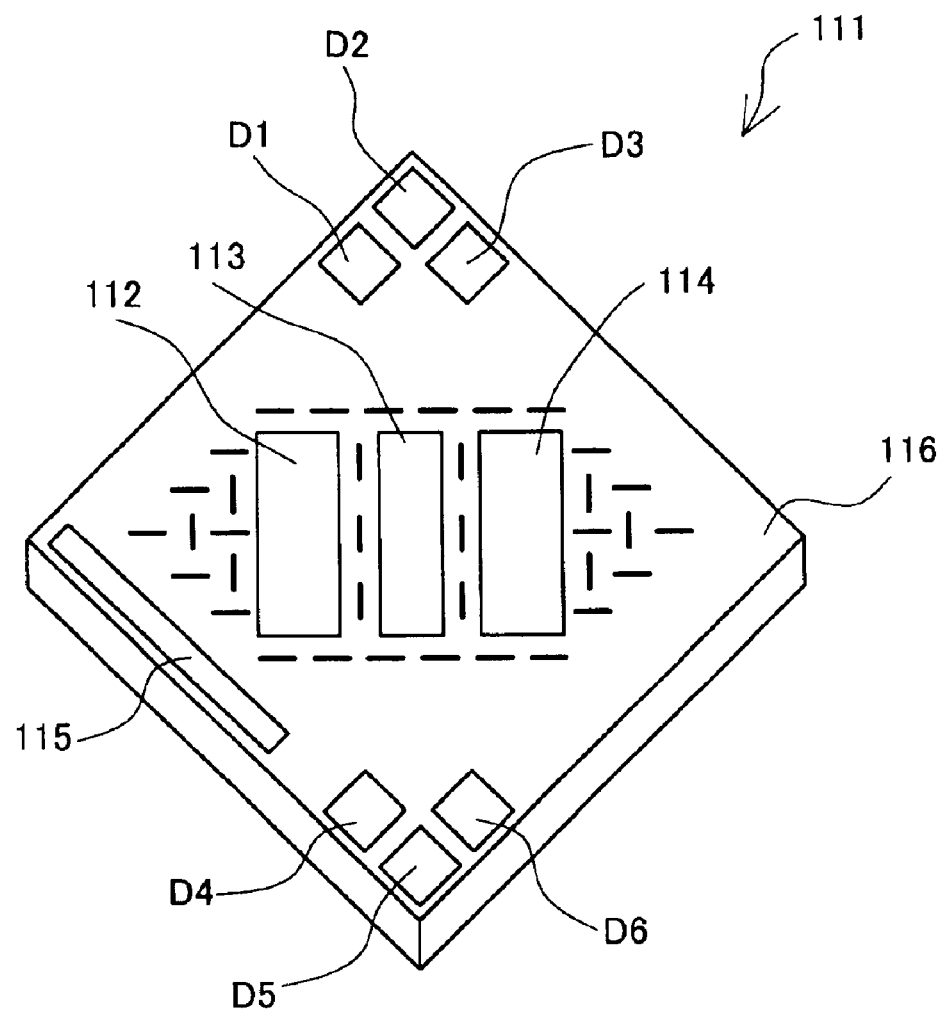
FIG. 24 is a perspective view of a measuring element used in the conventional thermal flow sensor.

In place of the laminated filter 70 fit in the passage space 44 in the body 41, a columnar pin 80 formed with a plurality of fins 81 as shown in FIG. 22 may be disposed in the main passage M. The use of such pin 80 in the main passage M similarly allows the formation of a plurality of passages in the main passage M, so that the flow of the fluid flowing through the main passage M can be made into a laminar flow.

By use of the thermal flow sensor in which the pin 80 is placed in the main passage M, the output was checked under the same conditions (a flow rate: 10 (l/min)) as those in the first embodiment. The noise in the sensor output is "16.22 (% FS)" and the noise in the amplifier output is "3.26 (% FS)".

It is to be noted that the bridge span is "0.469 (V)". In the conventional thermal flow sensor, the noise in the sensor output is "22.36 (% FS)" and the noise in the amplifier output is "4.96 (% FS)". As a result, even where the pin 80 is merely placed in the main passage M, the noise can be reduced to about three-fourth the noise in the conventional thermal flow sensor. That is, stabilization of the measurement output can be improved, but the effect of stabilization is not very large.

As explained above, the thermal flow sensor 401 in the fourth embodiment includes the laminated filter 70 fit in the passage space 44 formed in the body 41, thereby providing the grooves 56E which divide the main passage M into a plurality of passages. The flow of the fluid flowing in the main passage M is thus made into a laminar flow. Accordingly, the flow of the fluid in the main passage M does not affect the flow of the fluid in the sensor passage S. In other words, the flow of the fluid can be stable in the sensor passage S even if a flow rate of the fluid to be measures becomes high. Consequently, stable measurement output can be produced even where the flow rate of the fluid to be measured is high.

The above embodiments are only examples and do not limit the present invention. The present invention may be embodied in other specific forms without departing from the spirit or essential characteristics thereof. For instance, although four types of the laminated filters are exemplified in the above embodiments, the laminated filter is not limited thereto and may be constructed of arbitrary combinations of the thin plates 51–56.

What is claimed is:

1. A thermal flow sensor including a sensor passage, a bypass passage with respect to the sensor passage, and a hot wire for measuring a flow rate being bridged across the sensor passage, wherein the thermal flow sensor further includes a filter placed between the bypass passage and the sensor passage, and wherein the bypass passage is made of a board having a front side on which an electrode connected to an electric circuit for performing a measurement principle using the hot wire is provided and a body formed with a fluid passage having a side opening, the board being attached to the body in close contact relation to close the side opening, and the sensor passage is made of a groove formed in at least one of a measuring chip and the board when the measuring chip provided thereon with the hot wire and an electrode connected to the hot wire is mounted on the board so that the electrode for the hot wire is joined to the electrode for the electric circuit.

2. A thermal flow sensor including a sensor passage, a bypass passage with respect to the sensor passage, and a hot wire for measuring a flow rate being bridged across the sensor passage, wherein the thermal flow sensor further includes a filter placed between the bypass passage and the sensor passage, and wherein the filter is made of a plurality of laminated meshes.

3. The thermal flow sensor according to claim 2, wherein the bypass passage is made of a board having a front side on which an electrode connected to an electric circuit for performing a measurement principle using the hot wire is provided and a body formed with a fluid passage having a side opening, the board being attached to the body in close contact relation to close the side opening, and the sensor passage is made of a groove formed in at least one of a measuring chip and the board when the measuring chip provided thereon with the hot wire and an electrode connected to the hot wire is mounted on the board so that the electrode for the hot wire is joined to the electrode for the electric circuit.

4. The thermal flow sensor according to claim 2, wherein the meshes are laminated through a spacer having a predetermined thickness.

5. The thermal flow sensor according to claim 4, wherein the bypass passage is made of a board having a front side on which an electrode connected to an electric circuit for performing a measurement principle using the hot wire is provided and a body formed with a fluid passage having a side opening, the board being attached to the body in close contact relation to close the side opening, and the sensor passage is made of a groove formed in at least one of a measuring chip and the board when the measuring chip provided thereon with the hot wire and an electrode connected to the hot wire is mounted on the board so that the electrode for the hot wire is joined to the electrode for the electric circuit.

6. A thermal flow sensor including a sensor passage, a bypass passage with respect to the sensor passage, and a hot wire for measuring a flow rate being bridged across the sensor passage, wherein the thermal flow sensor further includes a laminar flow mechanism for making the flow of a fluid into a laminar flow, the laminar flow mechanism including a plurality of passages provided in the bypass passage, and wherein the bypass passage is made of a board having a front side on which an electrode connected to an electric circuit for performing a measurement principle using the hot wire is provided and a body formed with a fluid passage having a side opening, the board being attached to the body in close contact relation to close the side opening, and the sensor passage is made of a groove formed in at least one of a measuring chip and the board when the measuring chip provided thereon with the hot wire and an electrode connected to the hot wire is mounted on the board so that the electrode for the hot wire is joined to the electrode for the electric circuit.

7. A thermal flow sensor including a sensor passage, a bypass passage with respect to the sensor passage, and a hot wire for measuring a flow rate being bridged across the sensor passage, wherein the thermal flow sensor further includes a laminar flow mechanism for making the flow of a fluid into a laminar flow, the laminar flow mechanism including a plurality of passages provided in the bypass passage, and wherein the laminar flow mechanism is made of laminated thin plates each having a groove.

8. The thermal flow sensor according to claim 7, wherein the bypass passage is made of a board having a front side on which an electrode connected to an electric circuit for performing a measurement principle using the hot wire is provided and a body formed with a fluid passage having a side opening, the board being attached to the body in close contact relation to close the side opening, and the sensor passage is made of a groove formed in at least one of a measuring chip and the board when the measuring chip provided thereon with the hot wire and an electrode connected to the hot wire is mounted on the board so that the electrode for the hot wire is joined to the electrode for the electric circuit.

9. The thermal flow sensor according to claim 7, wherein each thin plate is formed with a plurality of grooves.

10. The thermal flow sensor according to claim 9, wherein the bypass passage is made of a board having a front side on which an electrode connected to an electric circuit for performing a measurement principle using the hot wire is provided and a body formed with a fluid passage having a side opening, the board being attached to the body in close contact relation to close the side opening, and the sensor passage is made of a groove formed in at least one of a measuring chip and the board when the measuring chip provided thereon with the hot wire and an electrode connected to the hot wire is mounted on the board so that the electrode for the hot wire is joined to the electrode for the electric circuit.

11. A thermal flow sensor including a sensor passage, a bypass passage with respect to the sensor passage, and a hot wire for measuring a flow rate being bridged across the sensor passage, wherein the thermal flow sensor further includes a laminar flow mechanism for making the flow of a fluid into a laminar flow, the laminar flow mechanism including a plurality of passages provided in the bypass passage, and wherein the laminar flow mechanism is a pin formed with a plurality of fins.

12. The thermal flow sensor according to claim 11, wherein the bypass passage is made of a board having a front side on which an electrode connected to an electric circuit for performing a measurement principle using the hot wire is provided and a body formed with a fluid passage having a side opening, the board being attached to the body in close contact relation to close the side opening, and the sensor passage is made of a groove formed in at least one of a measuring chip and the board when the measuring chip provided thereon with the hot wire and an electrode connected to the hot wire is mounted on the board so that the electrode for the hot wire is joined to the electrode for the electric circuit.

13. A thermal flow sensor including a sensor passage, a bypass passage with respect to the sensor passage, and a hot wire for measuring a flow rate being bridged across the sensor passage, wherein the thermal flow sensor further includes a blocking wall which partitions the sensor passage from the bypass passage, a fluid flowing out of the sensor passage and a fluid flowing out of the bypass passage merging at an outlet passage formed in a body to receive the sensor passage and the bypass passage.

14. The thermal flow sensor according to claim 13, wherein the bypass passage is made of a board having a front side on which an electrode connected to an electric circuit for performing a measurement principle using the hot wire is provided and a body formed with a fluid passage having a side opening, the board being attached to the body in close contact relation to close the side opening, and the sensor passage is made of a groove formed in at least one of a measuring chip and the board when the measuring chip provided thereon with the hot wire and an electrode connected to the hot wire is mounted on the board so that the electrode for the hot wire is joined to the electrode for the electric circuit.

15. The thermal flow sensor according to claim 13, wherein the outlet passage is formed in nonalignment relation with the bypass passage.

16. The thermal flow sensor according to claim 15, wherein the bypass passage is made of a board having a front side on which an electrode connected to an electric circuit for performing a measurement principle using the hot wire is provided and a body formed with a fluid passage having a side opening, the board being attached to the body in close contact relation to close the side opening, and the sensor passage is made of a groove formed in at least one of a measuring chip and the board when the measuring chip provided thereon with the hot wire and an electrode connected to the hot wire is mounted on the board so that the electrode for the hot wire is joined to the electrode for the electric circuit.

17. The thermal flow sensor according to claim 15, wherein the blocking wall is made of a plurality of laminated blocking plates.

18. The thermal flow sensor according to claim 17, wherein the bypass passage is made of a board having a front side on which an electrode connected to an electric circuit for performing a measurement principle using the hot wire is provided and a body formed with a fluid passage having a side opening, the board being attached to the body in close contact relation to close the side opening, and the sensor passage is made of a groove formed in at least one of a measuring chip and the board when the measuring chip provided thereon with the hot wire and an electrode connected to the hot wire is mounted on the board so that the electrode for the hot wire is joined to the electrode for the electric circuit.

19. The thermal flow sensor according to claim 13, wherein the blocking wall is made of a plurality of laminated blocking plates.

20. The thermal flow sensor according to claim 19, wherein the bypass passage is made of a board having a front side on which an electrode connected to an electric circuit for performing a measurement principle using the hot wire is provided and a body formed with a fluid passage having a side opening, the board being attached to the body in close contact relation to close the side opening, and the sensor passage is made of a groove formed in at least one of a measuring chip and the board when the measuring chip provided thereon with the hot wire and an electrode connected to the hot wire is mounted on the board so that the electrode for the hot wire is joined to the electrode for the electric circuit.

21. A thermal flow sensor including:

a bypass passage made of a board having a front side on which an electrode connected to an electric circuit for performing a measurement principle using a hot wire is provided and a body formed with a fluid passage having a side opening and an outlet passage formed in nonalignment relation with the fluid passage, the board being attached to the body in close contact relation to close the side opening;

a sensor passage made of a groove formed in at least one of a measuring chip and the board when the measuring chip provided thereon with the hot wire and an electrode connected to the hot wire is mounted on the board so that the electrode for hot wire is joined to the electrode for electric circuit;

a filter made of a plurality of laminated meshes, which is placed between the bypass passage and the sensor passage; and a blocking wall which causes a fluid flowing out of the sensor passage and a fluid flowing out of the bypass passage to meet at the outlet passage.

22. The thermal flow sensor according to claim 21, wherein the blocking wall is constructed of a plurality of blocking plates, and the filter and the blocking wall are included in a single laminate.

* * * * *